United States Patent
Ooi et al.

(10) Patent No.: US 11,749,423 B2
(45) Date of Patent: Sep. 5, 2023

(54) ELECTRIC WIRE CONDUCTOR, COVERED ELECTRIC WIRE, WIRE HARNESS, AND METHOD FOR MANUFACTURING ELECTRIC WIRE CONDUCTOR

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Hayato Ooi, Yokkaichi (JP); Yasuyuki Otsuka, Yokkaichi (JP); Kinji Taguchi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 45 days.

(21) Appl. No.: 16/975,155

(22) PCT Filed: Mar. 14, 2018

(86) PCT No.: PCT/JP2018/009907
§ 371 (c)(1),
(2) Date: Aug. 24, 2020

(87) PCT Pub. No.: WO2019/176001
PCT Pub. Date: Sep. 19, 2019

(65) Prior Publication Data
US 2021/0090757 A1    Mar. 25, 2021

(51) Int. Cl.
*H01B 5/08* (2006.01)
*H01B 7/00* (2006.01)
(Continued)

(52) U.S. Cl.
CPC ............. *H01B 5/08* (2013.01); *H01B 7/0009* (2013.01); *H01B 7/0045* (2013.01); *H01B 7/282* (2013.01);
(Continued)

(58) Field of Classification Search
CPC .......... H01B 7/00; H01B 5/08; H02G 3/0456; H02G 3/32; H02G 3/04; H02G 3/30;
(Continued)

(56) References Cited

U.S. PATENT DOCUMENTS 1,231,568 A * 7/1917 Clark ..................... H01B 11/04
174/102 R
1,691,869 A * 11/1928 Fowle ...................... H01B 5/08
174/128.1
(Continued)

FOREIGN PATENT DOCUMENTS

DE        662806 C      7/1938
DE        698278 C      11/1940
(Continued)

OTHER PUBLICATIONS

Jun. 25, 2021 Office Action issued in U.S. Patent Application No. 16/977,635.
(Continued)

*Primary Examiner* — Krystal Robinson
(74) *Attorney, Agent, or Firm* — Oliff PLC

(57) ABSTRACT

An electric wire conductor is excellent in space saving and flexibility and is less likely to concentrate a load on specific elemental wires, and a covered electric wire and a wire harness contain the electric wire conductor. The electric wire conductor contains a wire strand containing a plurality of elemental wires twisted together. The wire strand has a sector-shaped part in which a cross-section intersecting an axial direction of the wire strand contains either a single (Continued)

edge or two edges touching each other at an apex, and an outward curve connecting the ends of the single edge or the two edges. In the sector-shaped part, the elemental wires having deformation ratios from a circle lower at an outer peripheral part facing an outer periphery of the sector-shaped part than at a center part of the sector-shaped part located inside the outer peripheral part in the cross-section intersecting the axial direction.

12 Claims, 6 Drawing Sheets

(51) Int. Cl.
*H01B 7/282* (2006.01)
*H01B 13/02* (2006.01)
*H01B 7/42* (2006.01)
*H01B 1/02* (2006.01)

(52) U.S. Cl.
CPC ......... *H01B 7/421* (2013.01); *H01B 13/0207* (2013.01); *H01B 13/0292* (2013.01); *H01B 1/023* (2013.01)

(58) Field of Classification Search
CPC .... H02G 7/056; H02G 15/007; H02G 3/0406; H02G 3/0437; H02G 3/0462; H02G 3/0608; H02G 3/0691; H02G 3/22; H02G 3/305; H02G 7/053; H02G 9/08
See application file for complete search history.

(56) References Cited

U.S. PATENT DOCUMENTS

| | | | | | |
|---|---|---|---|---|---|
| 1,692,767 | A | * | 11/1928 | Davis | H01B 5/08 29/445 |
| 2,235,139 | A | * | 3/1941 | Bruce | H01Q 1/287 343/826 |
| 3,831,132 | A | * | 8/1974 | Bowden, Jr. | H01R 4/188 439/442 |
| 3,906,308 | A | * | 9/1975 | Amason | B64D 45/02 428/116 |
| 5,260,516 | A | | 11/1993 | Blackmore | |
| 5,496,969 | A | * | 3/1996 | Blackmore | H01B 5/08 174/113 A |
| 5,732,875 | A | * | 3/1998 | Ziemek | H01B 13/2633 228/148 |
| 7,696,430 | B2 | * | 4/2010 | Santos Lopez | H01B 9/006 174/117 R |
| 8,575,489 | B2 | * | 11/2013 | Oka | H01B 7/423 174/15.5 |
| 8,757,560 | B2 | * | 6/2014 | Darnell | H02G 3/0456 248/65 |
| 8,878,068 | B2 | * | 11/2014 | Goto | H01B 7/0009 174/128.1 |
| 8,963,006 | B2 | * | 2/2015 | Kuwayama | H01R 4/188 174/113 A |
| 9,484,640 | B2 | * | 11/2016 | Yamaji | H01R 43/0488 |
| 9,522,640 | B2 | | 12/2016 | Kanagawa | |
| 10,176,908 | B2 | | 1/2019 | Tanaka et al. | |
| 10,305,240 | B2 | * | 5/2019 | Kihara | H01R 4/62 |
| 10,370,743 | B2 | * | 8/2019 | Kobayashi | C22F 1/05 |
| 2012/0261185 | A1 | | 10/2012 | Murao et al. | |
| 2013/0068523 | A1 | | 3/2013 | Sato et al. | |
| 2016/0059802 | A1 | | 3/2016 | Kanagawa | |
| 2017/0110218 | A1 | | 4/2017 | Wakabayashi et al. | |
| 2017/0309373 | A1 | | 10/2017 | Tanaka et al. | |
| 2019/0259511 | A1 | * | 8/2019 | Ooi | H01B 13/01209 |

FOREIGN PATENT DOCUMENTS

| | | |
|---|---|---|
| JP | S63-158710 A | 7/1988 |
| JP | H05-159628 A | 6/1993 |
| JP | H05-62917 U | 8/1993 |
| JP | H08-249926 A | 9/1996 |
| JP | 2003-331671 A | 11/2003 |
| JP | 2006-260898 A | 9/2006 |
| JP | 2006-269201 A | 10/2006 |
| JP | 2011-134667 A | 7/2011 |
| JP | 2011-238508 A | 11/2011 |
| JP | 2016-054030 A | 4/2016 |
| JP | 2017-45523 A | 3/2017 |
| JP | 2017-79151 A | 4/2017 |
| WO | 2017/056278 A1 | 4/2017 |
| WO | 2018/088419 A1 | 5/2018 |

OTHER PUBLICATIONS

Sep. 1, 2021 Notice of Allowance issued in U.S. Appl. No. 16/977,635.
Sep. 15, 2021 Notice of Allowance issued in U.S. Appl. No. 16/977,635.
Aug. 3, 2021 Office Action issued in Chinese Patent Application No. 201980016151.7.
May 1, 2018 International Search Report issued in International Patent Application No. PCT/JP2018/009907.
May 21, 2019 International Search Report issued in International Patent Application No. PCT/JP2019/010248.
U.S. Appl. No. 16/977,635, filed Sep. 2, 2020 in the name of Kyoma Sahashi et al.
Sep. 21, 2021 Office Action issued in Japanese Patent Application No. 2020-506012.
Jun. 8, 2021 Office Action issued in Japanese Patent Application No. 2020-506601.
Oct. 20, 2022 Office Action issued in German Patent Application No. 112018007264.9.

\* cited by examiner

ELECTRIC WIRE CONDUCTOR, COVERED ELECTRIC WIRE, WIRE HARNESS, AND METHOD FOR MANUFACTURING ELECTRIC WIRE CONDUCTOR

TECHNICAL FIELD

The present invention relates to an electric wire conductor, a covered electric wire, a wire harness, and a method for manufacturing an electric wire conductor; and more specifically to an electric wire conductor formed by deformation of a wire strand in which a plurality of elemental wires are twisted together, a covered electric wire and a wire harness containing the electric wire conductor, and a method for manufacturing the electric wire conductor.

BACKGROUND ART

In recent years, performance of an automobile has advanced and the numbers of electric wires and parts installed in an automobile have been increasing. Meanwhile, in automobiles such as electric vehicles, the diameters of used electric wires are getting larger due to increase in the electric current to be applied.

Further, aluminum or an aluminum alloy is getting used as an electric wire conductor more frequently from the viewpoint of weight reduction of an electric wire. Since the electric conductivity of aluminum and an aluminum alloy, however, is lower than the electric conductivity of copper and a copper alloy, an electric wire containing an electric wire conductor made of aluminum or an aluminum alloy is required to have a conductor cross-sectional area larger than an electric wire containing an electric wire conductor made of copper or a copper alloy in order to secure necessary electric conduction and thus the outer diameters of the electric wire conductor and covered electric wire having an insulator on the outer periphery of the electric wire conductor increase undesirably.

Spaces where individual electric wires can be routed are decreasing because of the increase of electric wires and parts and increase of electric wire diameters, as stated above. Thus, it is required to route electric wires or wire harnesses efficiently while ensuring sufficient conductor cross-sectional areas. Electric wires constituting a wire harness generally have circular cross-sections. If the electric wires with circular cross-sections are bundled or arranged electric wires, large useless spaces will be generated.

In some cases, a plurality of electric wires may be bundled with a pipe or the like and used as a wire harness for the purpose of magnetic shield, prevention of interference with external substances. On this occasion, with the aim of reducing useless spaces in a pipe, Patent Literature 1 discloses single-core electric wire conductors having semicircular cross-sections, for example.

CITATION LIST

Patent Literature

Patent Literature 1: JP 2016-054030 A

SUMMARY OF INVENTION

Technical Problem

In order to route electric wires efficiently, it is desirable to bend the electric wires flexibly and route the electric wires so that they may fit in a limited space. In the case of electric wire conductors consisting of single core conductors as disclosed in Patent Literature 1, however, individual electric wires are less flexible and the degree of freedom in routing is low. In particular, electric wires with large conductor cross-sectional areas have problems in cable routing.

Flexibility can be improved when an electric wire conductor similar to those disclosed in Patent Literature 1 is configured as a wire strand containing a plurality of elemental wires. Conventionally, when such an electric wire conductor is manufactured, a processing method such as a drawing process where a force is applied to pull the electric wire conductor in an axial direction through a compression die has been used, for example. When such a processing method is used, however, a load is likely to be concentrated on elemental wires located on an outer peripheral part of the electric wire conductor, and a sharp protrusion structure (such as a burr) is likely to be formed on the outer peripheral part. Thus, it has been difficult to apply the processing method particularly to an electric wire conductor with a large conductor cross-sectional area and an electric wire conductor with many elemental wires constituting a wire strand.

The present invention has been made to solve the above problems, and an object of the present invention is to provide an electric wire conductor that is excellent in space saving and flexibility and is less likely to concentrate a load on specific elemental wires; and a covered electric wire and a wire harness that contains the electric wire conductor.

Solution to Problem

An electric wire conductor according to the present invention contains a wire strand containing a plurality of elemental wires twisted together. The wire strand contains a sector-shaped part in which a cross-section of the wire strand intersecting an axial direction of the wire strand contains either a single edge or two edges touching each other at an apex, and an outward curve connecting the ends of the single edge or the two edges. In the sector-shaped part, the elemental wires have deformation ratios from a circle lower at an outer peripheral part facing an outer periphery of the sector-shaped part than at a center part of the sector-shaped part located inside the outer peripheral part in the cross-section intersecting the axial direction.

The deformation ratios of the elemental wires in the sector-shaped part from a circle at the outer peripheral part facing the outer periphery of the sector-shaped part are desirably 75% or lower of the deformation ratios at the center part of the sector-shaped part in the cross-section intersecting the axial direction.

The deformation ratios of the elemental wires in the sector-shaped part from a circle are desirably 15% or lower at the outer peripheral part facing the outer periphery of the sector-shaped part in the cross-section intersecting the axial direction.

The electric wire conductor desirably has a vacancy ratio, which is a ratio of vacant spaces not occupied by the elemental wires, of 15% or higher in the cross-section intersecting the axial direction in the sector-shaped part.

The electric wire conductor desirably has a continuous vacant space which can accommodate at least one of the elemental wires in the cross-section intersecting the axial direction in the sector-shaped part.

The number of the elemental wires contained in the wire strand is desirably 50 or larger.

At least some of the elemental wires desirably contains aluminum or an aluminum alloy.

A covered electric wire according to the present invention contains the electric wire conductor described above and an insulator covering the outer periphery of the electric wire conductor.

A wire harness according to the present invention contains the covered electric wire described above.

The wire harness desirably contains a plurality of the above-described covered electric wires, placed with the edges of the sector-shaped parts of the adjacent electric wire conductors facing each other via the insulators.

The wire harness according desirably contains a heat dissipation sheet placed between the covered electric wires.

A method for manufacturing an electric wire conductor according to the present invention, to manufacture the electric wire conductor described above, contains a compression step pressurizing a raw wire strand containing elemental wires twisted together with rollers from a first direction and a second direction which intersect an axial direction of the raw wire strand and oppose each other.

At least one of the rollers desirably contains a groove part touching the raw wire strand at least at apart in a circumferential direction. The roller having the groove part touches the other roller at ends of the groove part, and has, at the ends of the groove part, notches to prevent the elemental wires constituting the raw wire strand from being caught between the rollers.

Advantageous Effects of Invention

An electric wire conductor according to the present invention contains not a single core conductor but a wire strand containing a plurality of elemental wires twisted together, and hence has high flexibility. Particularly when the wire strand has a collective twist structure where a plurality of elemental wires are twisted together integrally, the elemental wires are prevented from being overloaded upon deformation of the electric wire shape because the elemental wires hardly intersect each other, and excellent flexibility is achieved.

Further, in an electric wire conductor according to the present invention, the deformation ratios of elemental wires from a circle at the outer peripheral part of the sector-shaped part are lower than the deformation ratios of elemental wires from a circle at the center part. That is, when an electric wire shape is deformed, the load applied to the elemental wires at the outer peripheral part is lower than the load applied to the elemental wires at the center part. As a result, it is possible to deform and compress the electric wire conductor sufficiently while preventing concentration of the load on the elemental wires at the outer peripheral part and generation of wire breakage or an uneven structure such as a sharp protrusion (i.e., a burr) is prevented at the outer peripheral part.

Furthermore, in an electric wire conductor according to the present invention, a cross-section intersecting an axial direction of the electric wire conductor has a sector shape that has either a single edge or two edges touching each other at an apex and an outward curve connecting the ends of the single edge or the two edges. Hence, when a plurality of covered electric wires containing the electric wire conductors are used in a bundle, the multiple covered electric wires can be arranged without a vacant space, achieving excellent space saving. The central angle of the sector-shaped part is not particularly limited. When the central angle is 180 degrees, the shape is a semicircle having a single edge.

The deformation ratios of the elemental wires from a circle at the outer peripheral part of the sector-shaped part are desirably 75% or lower, more desirably 70% or lower, and yet more desirably 50% or lower of the deformation ratios of the elemental wires from a circle at the center part. When the deformation ratios of the elemental wires from a circle at the outer peripheral part of the sector-shaped part are 75% or lower of the deformation ratios of the elemental wires from a circle at the center part, the electric wire conductor can be deformed and compressed sufficiently effectively while preventing concentration of a load on the elemental wires at the outer peripheral part and generation of wire breakage or an uneven structure such as a sharp protrusion at the outer peripheral part.

The deformation ratios of the elemental wires from a circle at the outer peripheral part of the sector-shaped part are desirably 15% or lower and more desirably 10% or lower. When the deformation ratios of the elemental wires from a circle at the outer peripheral part of the sector-shaped part are 15% or lower, the effects of preventing concentration of the load on the elemental wires at the outer peripheral part and generation of wire breakage or an uneven structure such as a sharp protrusion at the outer peripheral part are obtained particularly effectively.

When the electric wire conductor has a vacancy ratio, which is a ratio of a vacant space not occupied by the elemental wires in the sector-shaped part, of 15% or higher in the cross-section, a particularly high flexibility is likely to be retained and the degree of freedom of cable routing is improved.

When the electric wire conductor has a continuous vacant space which can accommodate at least one of the elemental wires in the cross-section in the sector-shaped part, the electric wire conductor can bend flexibly by utilizing movement of the elemental wires into the vacant space, and thus the effect of keeping the flexibility of the electric wire conductor high is particularly good.

When the number of elemental wires constituting the wire strand is 50 or larger, the wire strand is easy to be formed into a sector-shaped cross-section by the change of the relative positions of the elemental wires even if the individual elemental wires are not deformed highly. In the electric wire conductor therefore, both space saving and flexibility are likely to be ensured and the elemental wires can be prevented from a damage such as breaking.

The covered electric wire according to the present invention is excellent in space saving and has high flexibility because the covered electric wire contains the electric wire conductor stated above. Further, by being formed into a sector shape, uneven structure is hardly generated on the electric wire conductor surface, the thickness of the insulator can be reduced, and excellent space saving is achieved.

The wire harness according to the present invention is excellent in space saving and has high flexibility because the wire harness contains the covered electric wire stated above. When a plurality of the covered electric wires are bundled, placing the edges of the sector-shaped parts so as to face each other, a substantially circular shape is formed by the combination of the multiple covered electric wires, while the curved parts of the sector-parts each connecting the ends of the edges are placed in a continuous manner. Thus, the multiple covered electric wires are easy to fit in a pipe or the like and are excellent in space saving particularly.

A wire harness according to the present invention is relatively hard to dissipate heat at the edges of the sector-shaped parts facing each other than at the curved parts exposed to the outside due to the reduced distance between the electric wires. By placing a heat dissipation sheet between the edges, however, it is possible to inhibit the influence of heat generation during application of electric current even when multiple covered electric wires are bundled with a pipe or the like. On this occasion, if the covered electric wires are bundled with a high heat conduction pipe made of aluminum for example, it is possible to dissipate heat efficiently from both the edges and the curved parts of the sector-shaped parts.

in the method for manufacturing an electric wire conductor according to the present invention, force is applied from two directions intersecting an axial direction of a raw wire strand. Thus, it is possible to inhibit a load from concentrating on the elemental wires at the outer peripheral part in comparison, for example, with a conventional drawing process, whereby the electric wire conductor can be deformed while the deformation ratios of the elemental wires at the outer peripheral part are reduced. It is therefore possible to form the electric wire conductor into a sector shape while preventing wire breakage and formation of a burr caused by application of a large force only to the elemental wires at the outer peripheral part, whereby the electric wire conductor achieve excellent space saving.

If at least one of the rollers has a grove part touching a raw wire strand at least at apart of the groove part in a circumferential direction, and notches to prevent elemental wires constituting the raw wire strand from being caught are formed at the ends of the groove part, clearances that can accommodate the elemental wires are formed at gaps formed by the groove part of the opposing rollers. The clearances can make the elemental wires constituting the raw wire strand hard to be caught between the rollers, and can prevent wire breakage and formation of a burr due to the catching of the elemental wires.

BRIEF DESCRIPTION OF DRAWINGS

In FIGS. 4A and 4B, elemental wires are omitted.

FIG. 7A shows a raw wire strand before compression, FIG. 7B shows Sample 1 compressed with a low pressure, and FIG. 7C shows Sample 2 compressed with a high pressure.

DESCRIPTION OF EMBODIMENTS

Embodiments according to the present invention are hereunder explained in detail in reference to drawings.

In the present description, shapes such as a circle, a sector, an edge, a straight line, and an arc are not limited to the shapes in the geometrical meaning, but also encompass shapes which are recognizable as the respective shapes such as a circle, a sector, an edge, a straight line, and an arc including deviation caused by factors such as materials and manufacturing processes.

Figure 1:
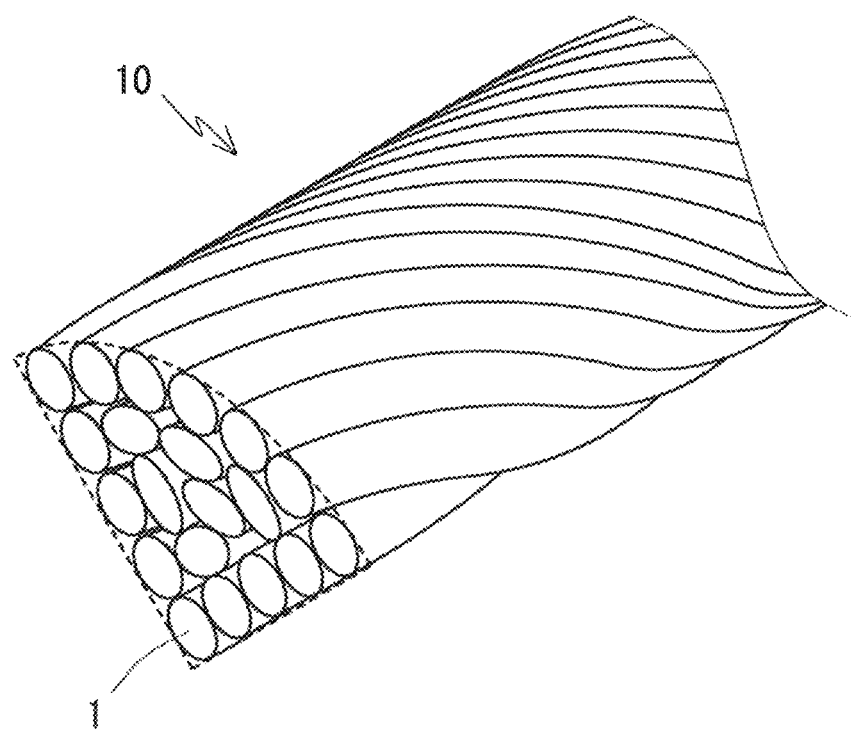
FIG. 1 is a perspective view showing an electric wire conductor according to a first embodiment of the present invention.
Figure 2:
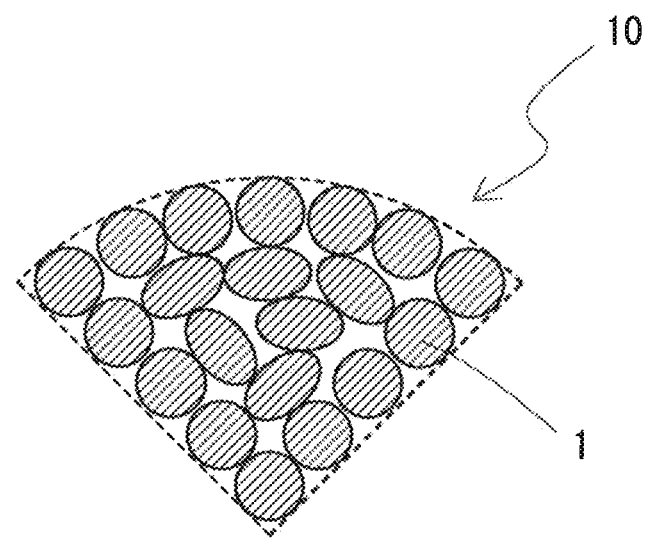
FIG. 2 is a sectional view of the electric wire conductor stated above.

An external appearance of an electric wire conductor 10 according to an embodiment of the present invention is shown as a perspective view in FIG. 1. Further, a cross-section of the electric wire conductor 10 perpendicular to an axial direction (longitudinal direction) is shown in FIG. 2. In the figures, elemental wires 1 constituting the electric wire conductor 10 are shown with a reduced number for ease of understanding.

[Electric Wire Conductor]

An electric wire conductor 10 is configured as a wire strand formed by twisting of a plurality of elemental wires 1 together. The electric wire conductor 10 has, at least at apart along an axial direction thereof, a cross-section of a sector shape having either a single edge or two edges touching each other at an apex and an outward curve connecting the ends of the single edge or the two edges. When having only a single edge, the sector shape takes a semicircular shape. In the present embodiment, a case of having a sector-shaped cross-section over the entire area of the electric wire conductor 10 is shown.

For the electric wire conductor 10 according to the present embodiment, in the cross-section perpendicularly intersecting the axial direction, deformation ratios of the elemental wires 1 are lower at a peripheral part facing the outer periphery of the electric wire conductor 10 than at a center part which is located inside of the peripheral part. FIGS. 1 and 2 schematically show distribution of the deformation ratio of such elemental wires 1.

Here, the deformation ratio of a certain elemental wire 1 is an index showing a degree of deviation from a circle for a cross-section of the elemental wire 1. For an elemental wire 1 actually contained in the electric wire conductor 10, a longest diameter A is defined as a length of the longest line crossing the cross-section while a circular diameter R is defined as a diameter of a circle having the same area as the cross-sectional area of the elemental wire 1. Then, a deformation ratio D of the elemental wire 1 is represented as follows:

$$D = (A-R)/R \times 100\% \quad (1)$$

The circular diameter R may be calculated based on a measured cross-sectional area of the elemental wire 1, or alternatively, if a diameter of the elemental wire 1 before deformed such as by pressing is known, or if a portion in which the elemental wires 1 are not deformed (corresponding to a low-flatness portion as will be described later) is also included in the same electric wire conductor 10, a diameter of the elemental wire 1 which is not deformed may be used as the circular diameter R. Further, only elemental wires 1 disposed on the outermost periphery of the electric wire conductor 10 may be employed as the elemental wires 1 in the peripheral part, and only elemental wires 1 disposed in the center of the electric wire conductor 10 may be employed as the elemental wires 1 in the center part; however, from the viewpoint of reducing influence of variation in deformation of the elemental wires 1, the deformation ratio D is preferably obtained as an average value of a plurality of elemental wires 1 included in regions having certain areas. For example, regions surrounded by rectangles with edges in a length of approximately 10 to 30% of the width W of the electric wire conductor 10, or regions surrounded by circles having diameters of approximately 10 to 30% of the width W may be employed including the outermost periphery or the center of the electric wire conductor 10, and such regions may be defined as the peripheral part and the center part, respectively.

When the deformation ratio of an elemental wires 1 at an outer peripheral part is lower than the deformation ratio of an elemental wires 1 at a center part, an electric wire conductor is deformed and compressed sufficiently while a load is prevented from concentrating on the elemental wires 1 at the outer peripheral part and while wire breakage or an uneven structure (burr) such as a sharp protrusion is prevented from being generated at the outer peripheral part.

Particularly when the electric wire conductor 10 according to the present embodiment is manufactured by deformation of a conventional general electric wire conductor having a substantially circular cross-section by compression or the like in particular, it is possible to inhibit a load from concentrating on the elemental wire 1 at the outer peripheral part by force applied for the compression.

The deformation ratio of the elemental wires at the outer peripheral part is desirably 75% or lower of the deformation ratio of the elemental wires at the center part. The proportion is more desirably 70% or lower, yet more desirably 50% or lower, and particularly desirably 20% or lower. When the deformation ratio of the elemental wires at the outer peripheral part of the sector-shaped part is 75% or lower of the deformation ratio of the elemental wires at the center part, the electric wire conductor can be deformed and compressed sufficiently effectively while a load is prevented from concentrating on the elemental wirew at the outer peripheral part and while wire breakage or an uneven structure such as a sharp protrusion is prevented from being generated at the outer peripheral part.

Further, the deformation ratio of the elemental wires from a circle at the outer peripheral part of the sector-shaped part is desirably 15% or lower, more desirably 10% or lower, and yet more desirably 5% or lower. When the deformation ratio of the elemental wires at the outer peripheral part of the sector-shaped part is 15% or lower, the effect of preventing a load from concentrating on the elemental wire at the outer peripheral part and preventing wire breakage or an uneven structure such as a sharp protrusion from being generated at the outer peripheral part is achieved particularly effectively.

The outer peripheral part can be categorized into four parts: edge parts and a curved part of the sector shape, corner parts where the edge parts and the curved part touch each other, and an apex part where the edges touch each other. The deformation ratios in the four parts tend roughly to have the following relationship: [edge parts]>[curved part]>[corner parts]>[apex part].

A central angle of the sector shape in the cross-section of the electric wire conductor 10 is not particularly limited. When the central angle is 180 degrees, a semicircular shape having a single edge is formed. The central angle may be decided appropriately in accordance with a routing configuration of the electric wire. For example, when three electric wires having the same size are routed together, the central angles of all the electric wires may be set to about 120 degrees and, when a plurality of the electric wires having different sizes are routed together, the central angles may be changed in accordance with the respective sizes.

The electric wire conductor 10 according to the present embodiment is configured as a wire strand formed by twisting of a plurality of elemental wires 1 together. The electric wire conductor 10 therefore has flexibility higher than a single core conductor having the same conductor cross-sectional area.

There are three types of twisting structures of wire strands: concentric twist in which a plurality of elemental wires are twisted together in layers concentrically around core wires; collective twist in which a plurality of elemental wires are twisted together collectively; and composite twist in which a plurality of wire strands twisted beforehand are further twisted together. Although it will be explained later in detail, an electric wire conductor 10 according to the present embodiment can be manufactured by compression and deformation of a raw wire strand 10' with a substantially circular cross-section. The raw wire strand 10' is desirably a wire strand of collective twist or concentric twist and more desirably is a wire strand of collective twist. In the case of a wire strand of collective twist or concentric twist, when a raw wire strand 10' is deformed, the elemental wires 1 hardly intersect each other and a load hardly concentrates on some of the elemental wires. Among them, in the case of a wire strand of collective twist, even when the number of constituent elemental wires 1 increases, the twist structure is not complicated further and the productivity is kept high.

The elemental wires 1 constituting an electric wire conductor 10 may be made of any conductive materials including metal materials. As representative materials constituting the elemental wires 1, copper, a copper alloy, aluminum, and an aluminum alloy can be used. Those metal materials are suitable for the electric wire conductor 10 according to the present embodiment because the metals are easy to forma desired shape by deformation and maintain a once formed shape firmly when the wire strand is formed. Aluminum and an aluminum alloy are desirable from the viewpoint of weight reduction and low cost of an electric wire conductor 10, and the viewpoint of significance of reducing a conductor diameter by compression. As the elemental wires 1 constituting the electric wire conductor 10, the elemental wires all made of the same material may be used, or several kinds of elemental wires 1 made of different materials may be mixed. When the electric wire conductor 10 contains several kinds of elemental wires 1 made of different materials, the deformation ratios of the outer peripheral part and the center part may preferably be compared based on the values of the deformation ratios of elemental wires 1 made of the same material, or based on average values of the different kinds of elemental wires 1.

The number of elemental wires 1 constituting the electric wire conductor 10 may be selected appropriately in accordance with desired conductivity. For example, it is desirable that 50 or more elemental wires 1 constitutes a wire strand. When the number of elemental wires 1 constituting a wire strand is larger, flexibility improves. Particularly when the number of elemental wires 1 is 50 or larger, the cross-section of the wire strand is easy to be formed into a sector shape, while large vacant spaces remain among the elemental wires, by the change of relative positions of the elemental wires even though individual elemental wires are not significantly deformed. The elemental wires 1 particularly at the outer peripheral part can be prevented from being overloaded A conductor cross-sectional area of an electric wire conductor 10 may be selected appropriately in accordance with a desired resistance. For example, a conductor cross-sectional area of the electric wire conductor 10 of 3 $mm^2$ or larger is desirable. The cross-sectional area is more desirably $50^{-2}$ or larger. When the conductor cross-sectional area is 3 $mm^2$ or larger, a large effect of space saving is brought about by the electric wire conductor 10 with the sector-shaped cross-section. Further, on those occasions, a desirable diameter of elemental wires 1 constituting the electric wire conductor 10 is 0.3 to 1.0 mm, for example.

In the electric wire conductor 10 according to the present embodiment, as long as the cross-section has a sector shape as the external shape of the entire electric wire conductor 10, the cross-sectional shapes of individual elemental wires 1 constituting the electric wire conductor 10 is not limited specifically. A general metal elemental wire has a substantially circular cross-section and such an elemental wire 1 can be applied also in the present embodiment. At least some of the elemental wires 1 in an electric wire conductor 10 may not be deformed and may remain in a substantially circular shape when the electric wire conductor 10 is formed into a sector shape. In the electric wire conductor 10 according to the present embodiment, elemental wires 1 not deformed are likely to remain particularly at the outer peripheral part.

When the electric wire conductor 10 ensures a vacancy ratio, which is a ratio of vacant spaces not occupied by elemental wires 1, of 15% or higher in a cross-section, the elemental wires 1 can take various relative positions by using the vacant spaces among the elemental wires 1. Hence, even when the shapes of the individual elemental wires 1 themselves are not significantly deformed, the cross-section of the electric wire conductor 10 can be formed easily into a desired shape depending on the relative positions of the elemental wires 1. The upper limit of the vacancy ratio is not particularly limited, but from the viewpoint of efficiency in forming a sector shape and retaining the formed sector shape, the vacancy ratio is desirably 30% or lower. The vacancy ratio is a ratio of a total area of vacant spaces of various sizes and shapes to the cross-sectional area of the electric wire conductor 10. When the total area of the vacant spaces is within a predetermined range in the cross-section of the electric wire conductor 10, the flexibility of the electric wire conductor 10 is enhanced. Further, in addition to that, the existence of vacant spaces with certain sizes as a continuous region is effective for improving the flexibility of the electric wire conductor 10. Specifically, it is desirable that the electric wire conductor 10 has, in the cross-section thereof, a continuous vacant space that can accommodate one or more elemental wires 1, or more desirably two or more elemental wires 1. This is because an elemental wire 1 can move into such a large vacant space, and the movement assists the flexible bending of the electric wire. Here, for the elemental wires 1 to be used for the judgement of whether or not they can be accommodated in a space, it is possible to use elemental wires 1 surrounding a certain vacant space or to assume elemental wires with a circular cross-section having the same cross-sectional area that an arbitrary elemental wire 1 constituting an electric wire conductor 10 has.

Figure 3:
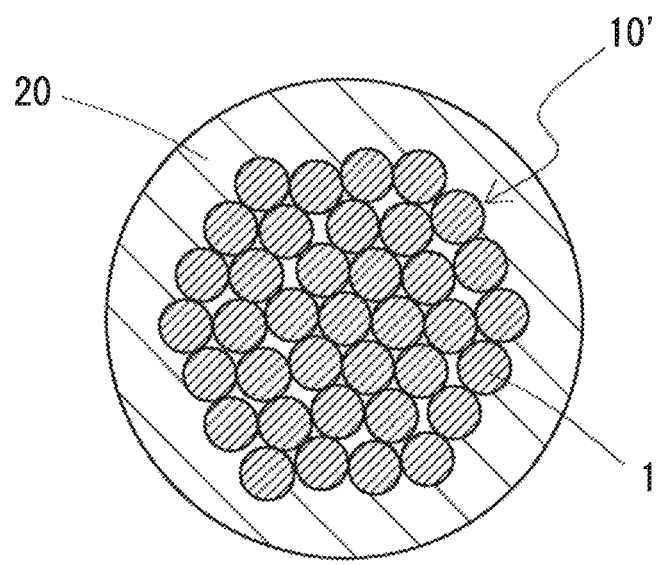
FIG. 3 is a sectional view of a conventional covered electric wire in which an electric wire conductor is not compressed.

In general, the wire strand 10' has unevenness on the outer periphery thereof as shown in FIG. 3 when compression processing is not applied; this applies especially when the number of elemental wires 1 constituting the wire strand 10' is small. When the wire strand 10' is covered with an insulator 20, the thickness of the insulator 20 is required to be secured sufficiently so that characteristics of the insulator 20 such as wear resistance may be satisfied even at a part where the thickness of the insulator 20 is smallest. It is possible to reduce unevenness at the outer periphery of the wire strand by forming the electric wire conductor 10 into a sector shape through compression processing. Then, the thickness of the insulator 20 as an average over the entire periphery can be reduced because the insulator 20 can be formed to have a uniform thickness capable of satisfying the characteristics over the entire periphery. As a result, excellent space saving can be achieved.

As stated above, an electric wire conductor 10 according to the present embodiment has both space saving property and flexibility and provides a high degree of freedom in cable routing. In an automobile for example, the numbers of installed wires and parts are increasing due to high functionality in recent years. Further, in an automobile such as an electric vehicle, electric current to be applied increases and hence the diameter of each electric wire is also increasing. As a result, spaces where individual electric wires can be routed are reducing. By using an electric wire conductor 10 according to the present invention, space saving and flexibility are excellent, and hence it is possible to route an electric wire using a small space effectively. The effect increases particularly in the case of accumulating many electric wires or using an electric wire having a large conductor cross-sectional area.

[Formation of Electric Wire Conductor]

Figure 5:
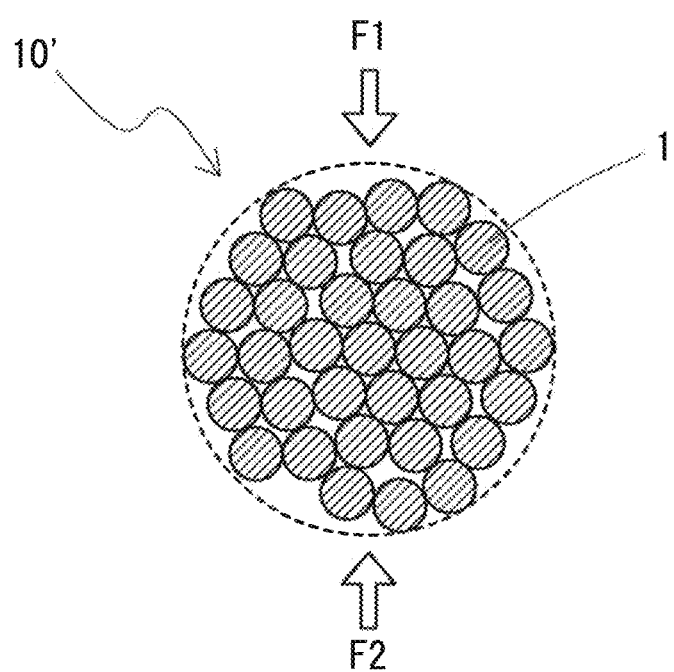
FIG. 5 is a sectional view explaining compression of a raw wire strand.

A manufacturing method of the electric wire conductor 10 according to the present embodiment is not particularly limited. For example, the electric wire conductor 10 can be formed by compression of a raw wire strand 10' containing a plurality of elemental wires 1 twisted together as shown in FIG. 5. On the compression, forces F1 and F2 are applied from a first direction and a second direction that are perpendicular to an axial direction of the raw wire strand 10' and oppose each other. If necessary, additional forces F3 and F4 may be applied to the raw wire strand 10' from a third direction and a fourth direction that intersect the first direction and the second direction and oppose each other. It is possible to deform the raw wire strand 10' efficiently by application of forces at least from opposing two directions. Further, it is possible to prevent pressure from being biased toward the elemental wires 1 at the outer peripheral part of the raw wire strand 10' and to form a deformed electric wire conductor 10 while the elemental wires 1 at the outer peripheral part do not undergo wire breakage or formation a burr on application of force from different directions in multiple steps.

Figure 6A:
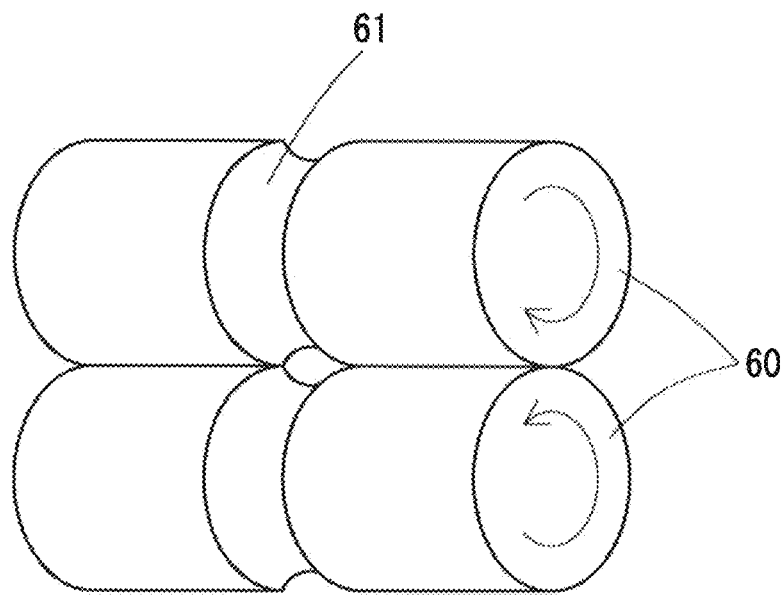
FIG. 6A is a perspective view of rollers to deform an electric wire conductor.
Figure 6B:
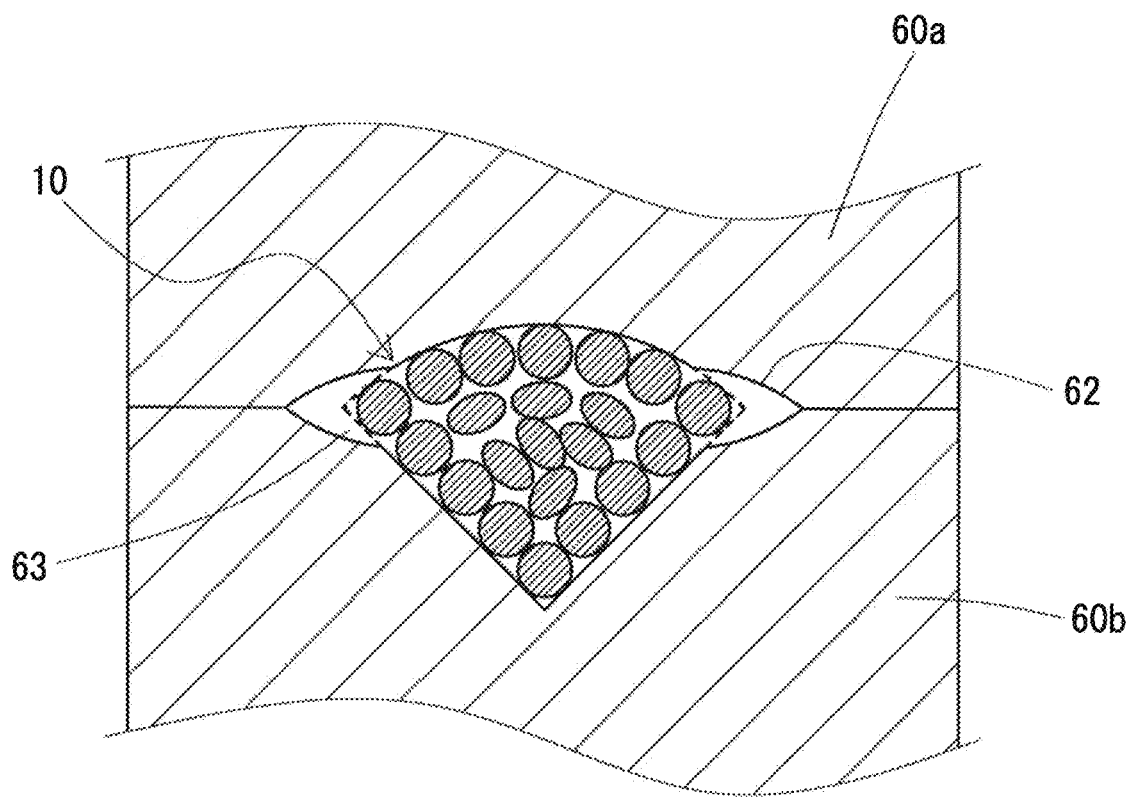
FIG. 6B is an enlarged view of FIG. 6A in a part where the rollers touch the electric wire conductor.

Force may be applied to a raw wire strand 10' from rollers 60 installed facing each other while passing the raw wire strand 10' between the rollers 60 as shown in FIGS. 6A and 6B, for example. By the use of the rollers 60 are used, force can be applied to the raw wire strand 10' while the paired rollers 60 facing each other rotate in opposite directions and the raw wire strand 10' is sent out by the rotation of the rollers 60. On this occasion, forces can be applied to the raw wire strand 10' from the outside toward the inside in the radial direction without application of a force to pull the raw wire strand 10' in an axial direction like in the case of compressing the raw wire strand 10' with a die. Since the rollers are widely open on the front side of the moving direction of the raw wire strand 10', large forces are not applied to the raw wire strand 10' there. Then, the forces applied to the raw wire strand 10' increases gradually toward the contact point between the two rollers 60. As a result, the applied forces spread throughout the raw wire strand 10', and thus it is possible to prevent a load from concentrating on the outer peripheral part of the raw wire strand 10'. Further, by the use of the rollers 60, a long raw wire strand 10' can be processed continuously while being fed, and the productivity of the process is improved.

Each of the rollers 60 has a groove part 61 along the circumferential direction and the groove part 61 touches a raw wire strand 10' at least at a part of the groove part 61.

The cross-sectional shape of the electric wire conductor 10 formed by compression with the rollers 60 reflects the shape of the groove part 61 touching the raw wire strand 10'. For example, an electric wire conductor 10 having a sector-shaped cross-section can be produced when one roller 60a of the paired rollers has an arc-shaped groove part and the other roller 60b has a V-shaped groove part, as shown in FIG. 6B.

It is desirable that the rollers 60 have notches 62 at the ends of the groove parts 61 where the rollers 60 face each other to prevent elemental wires 1 from being caught between the rollers 60. Specifically, as shown in FIG. 6B, the notches can be configured as a structure inclining so as to be apart from the raw wire strand 10' in an axial direction of the rollers 60, for example. When the raw wire strand 10' is compressed, it sometimes happens that some of the constituent elemental wires 1 are caught between the rollers. Then, a burr, which is a sharply protruding deformation, may be generated, or the elemental wires 1 caught between the rollers may break. If the notches 62 are formed at the ends of the groove parts 61, gaps formed between the groove parts 61 of the opposing rollers 60 form clearances 63 that can accommodate the elemental wires 1 so as not to be caught by the roller. Thus, the elemental wires 1 are less likely to be caught. As a result, the generation of a burr or wire breakage caused by catching of the elemental wires 1 can be prevented.

As stated above, by applying forces F1 and F2 with rollers from the first direction and the second direction that are perpendicular to the axial direction of the raw wire strand 10' and oppose each other, it is possible to manufacture an electric wire conductor 10 having a deformation ratio of the elemental wires 1 at the outer peripheral part lower than a deformation ratio at the center part. Conventionally, when an electric wire conductor configured as a wire strand with a substantially circular cross-section is deformed, a processing method such as a drawing process has been used where a force is applied to pull the electric wire conductor in the axial direction with a compression die or the like. In such a processing method, however, a load is likely to concentrate on elemental wires at an outer peripheral part and the deformation ratio of the elemental wires at the outer peripheral part tends to increase. As a result, when an electric wire conductor with a large conductor cross-sectional area or an electric wire conductor having many elemental wires constituting a wire strand is deformed in particular, a large pulling force is required, and thus a burr or wire breakage has been likely to be generated, whereby manufacturing of the wire conductor is difficult. A manufacturing method according to the present embodiment is suitable particularly for the case where the wire conductor 10 has a large cross-sectional area or contains many elemental wires constituting a wire strand, which has been difficult to be manufactured.

[Covered Electric Wire]

A covered electric wire 30 according to an embodiment of the present invention contains the electric wire conductor 10 according to the embodiment of the present invention as described above, and an insulator 20 which covers the outer periphery of the electric wire conductor 10.

A material of the insulator 20 is not specifically limited and the insulator 20 can be made of various polymeric materials. Further, a polymeric material may contain a filler or an additive as appropriate. The material and thickness of the insulator 20 may be selected as appropriate in accordance with desired characteristics of the insulator 20 such as wear resistance and flexibility. From the viewpoint of space saving and flexibility, the thickness of the insulator 20 should not be excessively large. For example, an insulator having an average thickness of 2.0 mm or smaller is desirable.

By forming an electric wire conductor 10 with a sector-shaped cross-section, it is possible to reduce unevenness on the outer periphery and to make the thickness of the insulator 20 small and homogeneous. As a result, it is possible to reduce the excessive thickness of the insulator 20 and to improve space saving.

An insulator 20 may take a form of integrally surrounding the entire periphery of an electric wire conductor 10. Such an insulator 20 can be formed by deposition of the polymeric material constituting the insulator 20 over the entire periphery of the electric wire conductor 10 by extrusion or the like.

When a roller device to produce an electric wire conductor 10 through deformation of the raw wire strand 10' and an extrusion device to extrude an insulator 20 are connected, it is possible to perform the processes from forming a compressed electric wire conductor 10 from a raw wire strand 10' to manufacturing a covered electric wire 30 continuously, which improves the productivity. Further, the steps for manufacturing the elemental wires 1: forming a raw wire strand 10', twisting the elemental wires 1 together, deforming the raw wire strand 10' obtained through the twisting, and extruding an insulator 20 can all be performed continuously to respective parts of a long material. Thus, high productivity can be attained if those processes are performed continuously.

The covered electric wire 30 may be used alone in the state where the outer periphery of the single electric wire conductor 10 is covered with the insulator 20 or may be used in the state of a wire harness in which a plurality of covered electric wires 30 are bundled integrally with a covering material or the like. The case of using the covered electric wire 30 in the form of a wire harness is explained hereunder.

[Wiring Harness]

A wire harness according to an embodiment of the present invention contains a plurality of covered electric wires 30 bundled together and at least one of the multiple covered electric wires 30 is the covered electric wire 30 according to the embodiment of the present invention which contains the electric wire conductor 10 with a sector-shaped cross-section. The wire harness may only contain covered electric wire(s) each of which has an electric wire conductor 10 with a sector-shaped cross-section as stated above, or may contain both a covered electric wire 30 with a sector-shaped cross-section and another kind of a covered electric wire such as a general covered electric wire having an electric wire conductor of a circular cross-section. Further, when a wire harness contains a plurality of the covered electric wires 30 each of which has an electric wire conductor 10 with a sector-shaped cross-section according to the present invention, the materials, shapes, and dimensions. of the electric wire conductors 10 and the insulators 20 constituting the multiple covered electric wires 30 may be identical to each other or different from each other.

Since a wire harness containing conventional covered electric wires bundled together is bulky as a whole, a living space (i.e., a space where passengers can stay) in an automobile becomes small in some cases to secure a routing space of the wire harness. By using the covered electric wire 30 containing the electric wire conductor 10 as stated above and keeping the space required for routing the wire harness small, however, it is possible to secure a large living space.

Figure 4A:
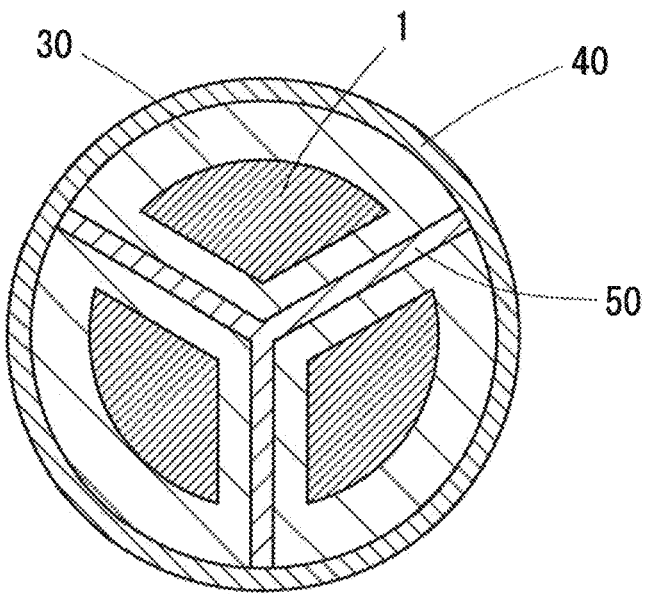
FIG. 4A is a sectional view of the covered electric wires according to the present invention when placed in a pipe.
Figure 4B:
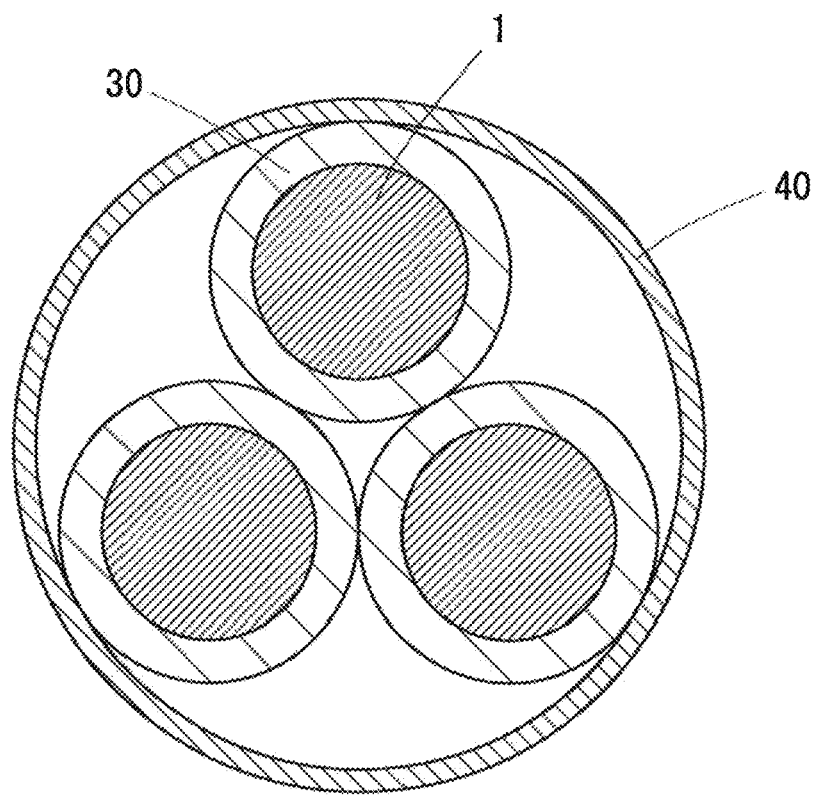
FIG. 4B is a sectional view of conventional covered electric wires when placed in a pipe.

Excellent space saving is achieved when a plurality of the covered electric wires 30 are integrated with a pipe for example, because the cross-section of each of the electric wire conductors 10 and covered electric wires 30 has a sector shape having a single edge or two edges touching each other at an apex and an outward curve connecting the ends of the single edge or the two edges. In a wire harness placed under the floor of an automobile in particular, a plurality of covered electric wires 30 are sometimes placed inside a cylindrical pipe shield 40. If the covered electric wires 30 have circular cross-sections on this occasion, useless spaces are generated in the interior of the pipe shield 40 as shown in FIG. 4B, and the pipe shield 40 needs to have a large diameter. Meanwhile, when covered electric wires 30 each of which has a semicircular or sector-shaped cross-section are placed so that the edges of the sector shapes may be adjacent to each other and the curves may form a circle continuously as shown in FIG. 4A, it is possible to place the covered electric wires 30 in the pipe shield 40 without vacant spaces and to reduce the diameter of the pipe shield 40.

Further, when a heat dissipation sheet 50 is placed between the covered electric wires 30, heat dissipation improves. The wire harness according to the embodiment of the present invention is less likely to dissipate heat at the opposing edges of the sector shapes than at the curved parts exposed to the outside as the distance between electric wires is small at the edge part. By placing a heat dissipation sheet 50 between the edge parts, however, it is possible to inhibit the influence of heat generation during application of electric currents even when multiple covered electric wires are placed by being bundled with a pipe or the like. On this occasion, if covered electric wires are bundled by a pipe made of a material having high thermal conductivity such as aluminum, heat can be dissipated from both the edge parts and the curved parts effectively.

The wire harness according to the present embodiment is excellent in space saving and flexibility and hence is excellent in cable routing. As a result, the conductor cross-sectional area can be increased, while securing a sufficient routing space, and thus the wire harness can be used suitably as a power line of an automobile such as an electric vehicle. When a power line is configured with the wire harness according to the present embodiment, containing small-diameter elemental wires 1, the electric wire conductor 10 as a whole has high resistance to bending and vibration. As a result, fatigue failure caused by engine vibration or the like is less likely to occur.

Examples

Hereinafter, examples according to the embodiment of the present invention are explained. It should be noted that the present invention is not limited by these examples.

[Cross-Section of Electric Wire Conductor]

For a cross-section of an electric wire conductor formed into a sector shape, state of deformation of elemental wires were observed.

(Test Method)

A raw wire strand having a substantially circular cross-sectional shape having a conductor cross-sectional area of 60 mm² was prepared by twisting 741 aluminum alloy wires having an outer diameter of 0.32 mm. The cross-sectional area of the raw wire strand was about 78.5 mm² when the vacant space among elemental wires was included.

An electric wire conductor with a sector-shaped cross-section was prepared by applying compression processing to the raw wire strand with rollers. Compression by rollers was performed by applying force from the top and bottom with a roller having an arc-shaped groove part and a roller having a V-shaped groove part. The cross-sectional area of the grooves parts was changed to change the force applied to the raw wire strand. A product obtained by being compressed with rollers having groove parts the cross-sectional area of which was 85% of the original raw wire strand is defined as Sample 1, and a product obtained by being compressed with rollers of 80% was defined as Sample 2. That is, Sample 2, which was processed with groove parts having smaller cross-sectional area, received high compression where a stronger force is applied. Successively, an insulator having a thickness of 1.5 mm made of PVC was applied to the outer periphery of each of the electric wire conductors.

Each of Sample 1 and Sample 2 was embedded in an epoxy-based resin, and a cross-section intersecting an axial direction was polished to prepare a cross-sectional sample. Then, the obtained cross-sectional samples were photographed.

Image analysis was applied to each cross-sectional photographic image, and deformation ratios of the elemental wires were evaluated. For the evaluation, a deformation ratio D of an elemental wire was calculated through the following expression (1) by defining a length of the longest straight line crossing the cross-section as a longest diameter A and a diameter of an elemental wire before deformed as a circular diameter R:

$$D=(A-R)/R\times 100\% \quad (1)$$

As the circular diameter R, a value 0.32 mm, which was the outer diameter of an elemental wire in a raw wire strand before deformed, was adopted. The deformation ratios of the elemental wires were estimated for the elemental wires contained in the outer peripheral part and the center part shown as the square regions R1 and R2 shown FIGS. 7B and 7C, respectively. Average values of the deformation ratios were calculated in respective regions. Further, as a proportion of the deformation ratio of the outer peripheral part to the deformation ratio of the center part, an outer periphery deformation proportion was calculated (i.e., [outer periphery deformation proportion]=[deformation ratio in outer peripheral part]/[deformation ratio in center part]×100%).

Further, vacancy ratios were evaluated by image analysis. In the analysis, a cross-sectional area of the entire electric wire conductor (A0) was estimated as the area of a region inside an outline connecting surfaces of elemental wires located at the outermost periphery of the electric wire conductor, and within the above-described region, the area of vacancies (A1) was estimated from the area of the regions that were not occupied by the elemental wires. Then, the vacancy ratio was calculated (A1/A0×100%).

(Test Results)

Figure 7A:
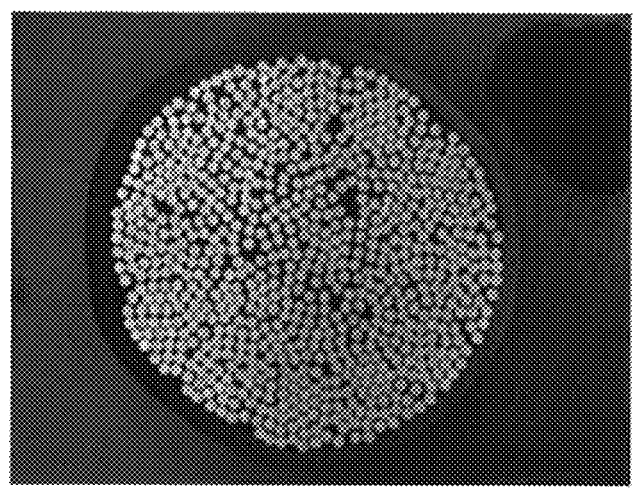
FIGS. 7A to 7C show photographs of cross-sections of covered electric wires.
Figure 7B:
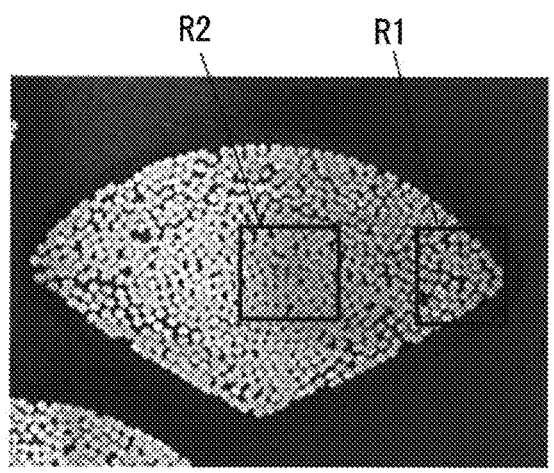
Figure 7C:
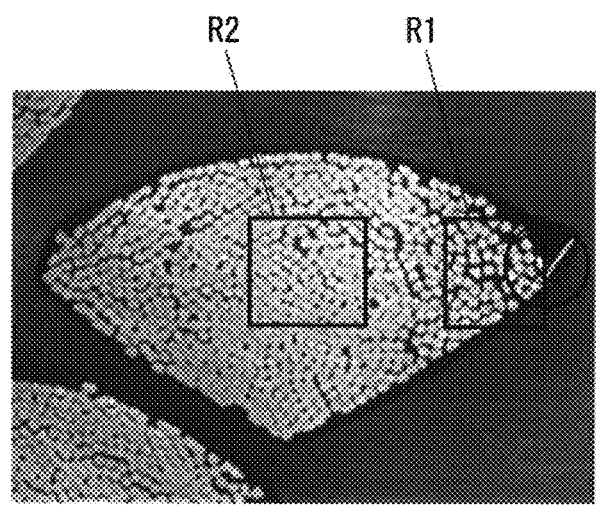

Photographs of the cross-sections of the covered electric wires are shown in FIGS. 7A to 7C. FIG. 7A shows the raw wire strand before compression, FIG. 7B shows Sample 1 applied the lower compression rate, and FIG. 7C shows Sample 2 applied the higher compression rate. Further, the values of the deformation ratios and the vacancy ratios of Sample 1 and Sample 2 obtained through image analysis are summarized in Table 1 below. Here, a cross-sectional area ratio in Table 1 is a value representing a cross-sectional area of the groove part formed in rollers as a percentage ratio to the cross-sectional area of a raw wire strand before compression (i.e., 78.5 mm²).

TABLE 1

Deformation ratio of elemental wires

| | Cross-sectional area ratio | Outer peripheral part | Center part | Outer peripheral deformation proportion | Vacancy ratio |
|---|---|---|---|---|---|
| Sample 1 | 85% | 2.6% | 18% | 14% | 16% |
| Sample 2 | 80% | 28% | 17% | 165% | 17% |

When comparing the cross-sectional photographs of Sample 1 and Sample 2 in FIGS. 7B and 7C, whereas the cross-sections of the elemental wires in Sample 1 are not significantly deformed from a substantially circular shape as before processing in FIG. 7A, many elemental wires are deformed significantly from a circle in Sample 2. Particularly when focusing on the corner part where the edges and the outward curve of the sector shape touch each other, whereas the outer periphery of the corner part is smooth in Sample 1, sharp burrs are observed as shown in the circle in Sample 2. Here, when compression was applied so that the deformation ratios in the outer peripheral part may be low like in Sample 1, the corner part tends to have relatively low deformation ratios in the outer peripheral part. Meanwhile, in Sample 2, where compression was applied at the higher compression rate with a roller having an arc-shaped groove part and a roller having a V-shaped groove part, sharply protruding burr structure was formed at the corner part located at the contact point of the rollers.

These trends seen in the photographs appear also in the image analysis results in Table 1. The deformation ratios of elemental wires at the center parts of the electric wire conductors are similar between Sample 1 and Sample 2. The deformation ratios at the outer peripheral parts, however, are significantly different between Sample 1 and Sample 2. In Sample 1, the deformation ratio at the outer peripheral part is as low as 2.6% and the deformation proportion to the deformation ratio at the center part is 14%. In Sample 2 in contrast, the deformation ratio at the outer peripheral part is 28%, which is 1.65 times of the deformation ratio at the center part. The value takes accounts also of the deformation ratios of the burrs observed in the circle in FIG. 7C, but even when the elemental wires forming the burrs are excluded from consideration, the deformation ratio at the outer peripheral part is 17% in Sample 2, which is considerably higher than the deformation ratio in Sample 1.

Meanwhile, the cross-sectional area ratio of the groove part of the rollers was lower for Sample 2 than for Sample 1 and thus the compression was applied at a higher pressure in Sample 2, but the vacancy ratio of Sample 2 is higher than the vacancy ratio of Sample 1 in Table 1. This means that Sample 2 was no tightly held by the covering material because of the presence of the burrs, and thus the electric wire conductor was loosened after the compression. Hence the apparent vacancy ratio became high.

Further, as it is obvious from the cross-sectional photographs in FIGS. 7B and 7C, Sample 1 and Sample 2 are compressed so that sufficient vacant spaces may remain among the elemental wires, and hence are excellent in flexibility.

As shown by the above-described results, the electric wire conductor according to the embodiment hardly receives an overload on the elemental wires at the outer peripheral part or causes failure such as a burr, since compression is applied so that the deformation ratio at the outer peripheral part may be lower than the deformation ratio at the center part. Thus, the electric wire conductor is excellent in space saving and flexibility.

Although embodiments of the present invention have been described above in detail, the present invention is not limited to the particular embodiment(s) disclosed herein, and various changes and modifications may be made without deviating from the scope of the present invention.

REFERENCE SIGNS LIST 1 elemental wire
10 electric wire conductor
10' raw wire strand
20 insulator
30 covered electric wire
40 pipe shield
50 heat dissipation sheet
60 roller
61 groove part
62 notch
63 clearance

The invention claimed is:

1. An electric wire conductor, comprising:
 a wire strand comprising:
  a sector-shaped part in which a cross-section of the wire strand intersecting an axial direction of the wire strand comprises:
   either a single edge or two edges touching each other at an apex;
   an outward curve connecting ends of the single edge or the two edges;
   an outer peripheral part facing an outer periphery of the sector-shaped part; and
   a center part located inside the outer peripheral part in the cross-section; and
  a plurality of elemental wires twisted together, elemental wires in the outer peripheral part having deformation ratios from a circle 75% or lower than deformation ratios from the circle of elemental wires in the center part.

2. The electric wire conductor according to claim 1, wherein the deformation ratios of the elemental wires in the outer peripheral part are 15% or lower.

3. The electric wire conductor according to claim 1, wherein the electric wire conductor has a vacancy ratio, which is a ratio of vacant spaces not occupied by the elemental wires, of 15% or higher in the cross-section.

4. The electric wire conductor according to claim 1, further comprising a continuous vacant space which can accommodate at least one of the elemental wires in the cross-section.

5. The electric wire conductor according to claim 1, wherein a number of the elemental wires contained in the wire strand is 50 or larger.

6. The electric wire conductor according to claim 1, wherein at least some of the elemental wires comprise aluminum or an aluminum alloy.

7. A covered electric wire, comprising:
 the electric wire conductor according to claim 1; and
 an insulator covering the outer periphery of the electric wire conductor.

8. A wire harness, comprising the covered electric wire according to claim 7.

9. A wire harness, comprising a plurality of the covered electric wires according to claim 7, placed with the edges of the sector-shaped parts of adjacent electric wire conductors facing each other via the insulators.

10. The wire harness according to claim 9, wherein the wire harness comprises a heat dissipation sheet placed between the covered electric wires.

11. A method for manufacturing an electric wire conductor to manufacture the electric wire conductor according to claim 1, the method comprising:
- a compression step pressurizing a raw wire strand comprising elemental wires twisted together with rollers from a first direction and a second direction which intersect an axial direction of the raw wire strand and oppose each other.

12. The method for manufacturing the electric wire conductor according to claim 11, wherein at least one of the rollers comprises a groove part touching the raw wire strand at least at a part in a circumferential direction,
- wherein the roller comprising the groove part touches the other roller at ends of the groove part, and comprises, at the ends of the groove part, notches to prevent the elemental wires constituting the raw wire strand from being caught between the rollers.

* * * * *